United States Patent
Zhan et al.

(10) Patent No.: US 11,473,782 B2
(45) Date of Patent: Oct. 18, 2022

(54) CONTACTLESS CONTROL DEVICE FOR A RANGE HOOD AND CONTROL METHOD THEREOF

(71) Applicant: NINGBO FOTILE KITCHEN WARE CO., LTD., Zhejiang (CN)

(72) Inventors: Deyou Zhan, Zhejiang (CN); Xiaozhe Qiu, Zhejiang (CN); Lei Wang, Zhejiang (CN); Zhongqun Mao, Zhejiang (CN); Yongding Zhu, Zhejiang (CN); Xianliang Fang, Zhejiang (CN)

(73) Assignee: NINGBO FOTILE KITCHEN WARE CO., LTD., Zhejiang (CN)

( * ) Notice: Subject to any disclaimer, the term of this patent is extended or adjusted under 35 U.S.C. 154(b) by 426 days.

(21) Appl. No.: 16/758,872

(22) PCT Filed: Jul. 26, 2018

(86) PCT No.: PCT/CN2018/000269
§ 371 (c)(1),
(2) Date: Apr. 24, 2020

(87) PCT Pub. No.: WO2019/080361
PCT Pub. Date: May 2, 2019

(65) Prior Publication Data
US 2021/0199309 A1  Jul. 1, 2021

(30) Foreign Application Priority Data
Oct. 25, 2017 (CN) .................. 201711005651.X

(51) Int. Cl.
*F24C 15/20* (2006.01)
*G08C 23/04* (2006.01)
*G05B 15/02* (2006.01)

(52) U.S. Cl.
CPC .......... *F24C 15/2078* (2013.01); *G05B 15/02* (2013.01); *G08C 23/04* (2013.01)

(58) Field of Classification Search
CPC .. F24C 15/2078; F24C 15/2021; G05B 15/02; G05B 2219/35444;G05B 2219/36418; G08C 23/04; G06F 3/017; H04N 1/00381; G06V 40/113; G06V 40/20; G06V 40/28
USPC ......... 700/275; 398/106; 341/31; 250/338.1, 250/339.02, 341.7, 341.8, 495.1
See application file for complete search history.

(56) References Cited

U.S. PATENT DOCUMENTS 5,406,073 A * 4/1995 Sharp .................. G01V 8/10
250/221
8,643,628 B1 * 2/2014 Eriksson ............... G06F 3/0421
345/173

(Continued)

FOREIGN PATENT DOCUMENTS

CN 102141806 8/2011
CN 103576861 2/2014

(Continued)

OTHER PUBLICATIONS

Guo Junbo, CN-104566591-A, pubished Apr. 2015, CN document with Enlish langauage translation, 2015.*

(Continued)

*Primary Examiner* — Edwin C Holloway, III
(74) *Attorney, Agent, or Firm* — JCIPRNET

(57) ABSTRACT

The present invention discloses a contactless control device for a range hood and a control method thereof. The contactless control device comprises two sets of infrared gesture sensing devices disposed on the housing of the range hood, and a detected signal analysis device. Each set of infrared gesture sensing devices comprises one infrared receiving device and at least one infrared transmitting device. The (Continued)

distance L between two infrared receiving devices meets the following condition: $H*\tan(\theta)+H*\tan(\beta)+W\_min<L<H*\tan(\theta)+H*\tan(\beta)+W\_max$. It is unnecessary to control the user's gesture sensing distance according to the intensity of the infrared transmitted signals. In this way, it is convenient to adjust the intensity of the infrared transmitted signals, and the infrared receiving device can better detect infrared signals.

5 Claims, 2 Drawing Sheets

(56) References Cited

U.S. PATENT DOCUMENTS

| | | | |
|---|---|---|---|
| 2015/0248796 A1* | 9/2015 | Iyer | G07C 9/20 |
| | | | 340/5.61 |
| 2017/0269699 A1* | 9/2017 | Withanage Don | G06K 9/6269 |
| 2018/0217670 A1* | 8/2018 | Cho | G06F 3/0446 |
| 2021/0294426 A1* | 9/2021 | Li | G06F 3/017 |

FOREIGN PATENT DOCUMENTS

| | | |
|---|---|---|
| CN | 104566591 | 4/2015 |
| CN | 105091046 | 11/2015 |
| CN | 105096580 | 11/2015 |
| CN | 207279755 | 4/2018 |

OTHER PUBLICATIONS

"International Search Report (Form PCT/ISA/210) of PCT/CN2018/000269," dated Oct. 11, 2018, with English translation thereof, pp. 1-4.

* cited by examiner

CONTACTLESS CONTROL DEVICE FOR A RANGE HOOD AND CONTROL METHOD THEREOF

CROSS-REFERENCE TO RELATED APPLICATION

This application is a national phase entrance of and claims benefit to PCT Application for a copper alloy containing cobalt and silicon, PCT/CN2018/000269, filed on Jul. 26, 2018, which claims benefit to Chinese Patent Applications 201711005651.X, filed on Oct. 25, 2017. The entirety of each of the above mentioned patent applications is hereby incorporated by reference herein and made a part of this specification.

BACKGROUND

Technical Field

The present invention relates to a contactless control device for a range hood and a control method thereof.

Description of Related Art

At present, most of range hoods available in the market are contact operated by hands. However, due to the special working environment in the kitchen, such contact operation is inconvenient for a user of kitchen appliances when the user's hands are covered with oil or flour, or when the user is unwilling to operate the oil-covered buttons with his or her clean hands.

In the prior art, although there have been some range hood control methods that use infrared signals for contactless control, they basically control the sensing distance by controlling the intensity of the infrared signals, and control the speed of swiping to avoid human interference, especially the interference from the head. In addition, the sweeping gestures are simply determined according to the time when the signals are received by different infrared receiving devices. These control methods also lack scientific design for the distribution of infrared transceivers. Due to unscientific distribution, a set of infrared receiving devices may receive signals transmitted by other sets of infrared transmitting devices. In this case, determining the operating gestures according to the time when the signals are received may make a mistake. Meanwhile, the control methods in the prior art do not really analyze the difference between gesture operations and interference signals or determine the validity of the detected signals. It is difficult to use these control methods.

SUMMARY

It is a first object of the present invention to provide a contactless control device for a range hood which can control the sensing distance without reducing the intensity of infrared signals.

It is a second object of the present invention to provide a control method for the contactless control device, which can control the sensing distance without reducing the intensity of infrared signals, and can accurately distinguish gesture signals and head interference signals.

For achieving the first object, the contactless control device for a range hood, the range hood comprises a housing, the contactless control device comprises two sets of infrared gesture sensing devices disposed on the housing, and a detected signal analysis device connected to the two sets of infrared gesture sensing devices, wherein, the two sets of infrared gesture sensing devices are defined as a set-a infrared gesture sensing device and a set-b infrared gesture sensing device, each set of the infrared gesture sensing devices comprises one infrared receiving device and at least one infrared transmitting device, and the infrared receiving device and all of the at least one infrared transmitting device of each set of infrared gesture sensing devices are connected to the detected signal analysis device, wherein, a distance L between two infrared receiving devices respectively in the two sets of the infrared gesture sensing devices meets the following condition:

$$H^*\tan(\theta)+H^*\tan(\beta)+W\_min<L<H^*\tan(\theta)+H^*\tan(\beta)+W\_max,$$

wherein, W_min represents a minimum value of a width of a person's hand and is a preset constant greater than 50 mm, W_min represents a maximum value of the width of the person's hand and is a preset constant less than 200 mm, θ represents a maximum infrared signal transmitting angle of the set-a infrared gesture sensing device at a direction close to the set-b infrared gesture sensing device, β represents a maximum infrared signal receiving angle of the set-b infrared gesture sensing device at a direction close to the set-a infrared gesture sensing device, and H is a preset maximum sensing distance A straight line is formed between the two infrared receiving devices in the two sets of the infrared gesture sensing devices, and a direction of the straight line is a gesture operation direction.

Each set of the infrared gesture sensing devices has multiple infrared transmitting devices all distributed in a circle, with the infrared receiving device being the center of the circle, and a radius of the circle is less than 30 m.

In each set of the infrared gesture sensing devices, an infrared light isolator is disposed between the infrared receiving device and the infrared transmitting devices.

In each set of infrared gesture sensing devices, a light filter configured to filter ambient light is disposed outside the infrared receiving device and the infrared transmitting devices.

To achieve the second object, the control method for a contactless control device having the above-mentioned structure is provided, wherein, the detected signal analysis device enables the two sets of the infrared gesture sensing devices to work in the same time and outputs a control signal through the following steps:

S1: the detected signal analysis device reads results of detection from the two infrared receiving devices in the two sets of the infrared gesture sensing devices, and outputs an invalid control signal if both of the two infrared receiving devices detect an infrared signal.

S2: if only one of the infrared receiving devices detects the infrared signal, the detected signal analysis device records a time duration when this infrared receiving device receives the infrared signal; if the time duration is greater than a first preset value, the detected signal analysis device uses the infrared signal received by this infrared receiving device as a specific valid signal; and if the time duration is less than the first preset value, the detected signal analysis device uses the infrared signal received by this infrared receiving device as a noise signal.

S3: on the basis of S2, if the detected signal analysis device determines that the infrared signal received by the infrared receiving device in the set-a infrared gesture sensing device is a specific valid signal, the detected signal analysis device starts timing, and a timing duration is represented by T_a; if T_a is greater than a second preset value, the detected signal analysis device outputs the invalid control signal and T_a is cleared; if T_a is not greater than the second preset value, the detected signal analysis device determines whether the infrared signal received by the infrared receiving device in the set-b infrared gesture sensing device is the specific valid signal, if the infrared signal received by the infrared receiving device in the set-b infrared gesture sensing device is the specific valid signal, the detected signal analysis device starts timing, and a timing duration is represented by T_b; if T_b is greater than the second preset value, the detected signal analysis device outputs the invalid control signal and T_b is cleared; if T_b is not greater than the second preset value, the detected signal analysis device continues determining whether the number of times that the infrared signal received by the infrared receiving device in the each of the two sets of the infrared gesture sensing devices is a noise signal exceeds a preset tolerable number; if the number of times that the infrared signal received by the infrared receiving device in any one set of the infrared gesture sensing devices is the noise signal exceeds the preset tolerable number, the detected signal analysis device outputs the invalid control signal; if the number of times that the infrared signal received by the infrared receiving device in both of the two sets of the infrared gesture sensing devices is the noise signal does not exceed the preset tolerable number, the detected signal analysis device continues determining whether T_a is greater than T_b; if T_a is greater than T_b, the detected signal analysis device outputs a first gesture control signal; and If T_a is less than T_b, the detected signal analysis device outputs a second gesture control signal.

Through this control method, the validity of the detected signals can be determined effectively, and gesture signals and head interference signals can be accurately distinguished. It provides an accurate control basis for the subsequent control functions, for example, turning a range hood on or off, or adjusting the speed of the range hood, by an output gesture signal.

Compared with the prior art, the present invention has the following advantages: in the contactless control device of the present invention, the positions of the two sets of infrared gesture sensing devices is well designed, accordingly, it is unnecessary to control the user's gesture sensing distance according to the intensity of the infrared transmitted signals. In this way, it is convenient to adjust the intensity of the infrared transmitted signals, the infrared receiving device can better detect infrared signals, and, it ensures that gesture operation signals within the maximum sensing distance will not interfere with each other.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
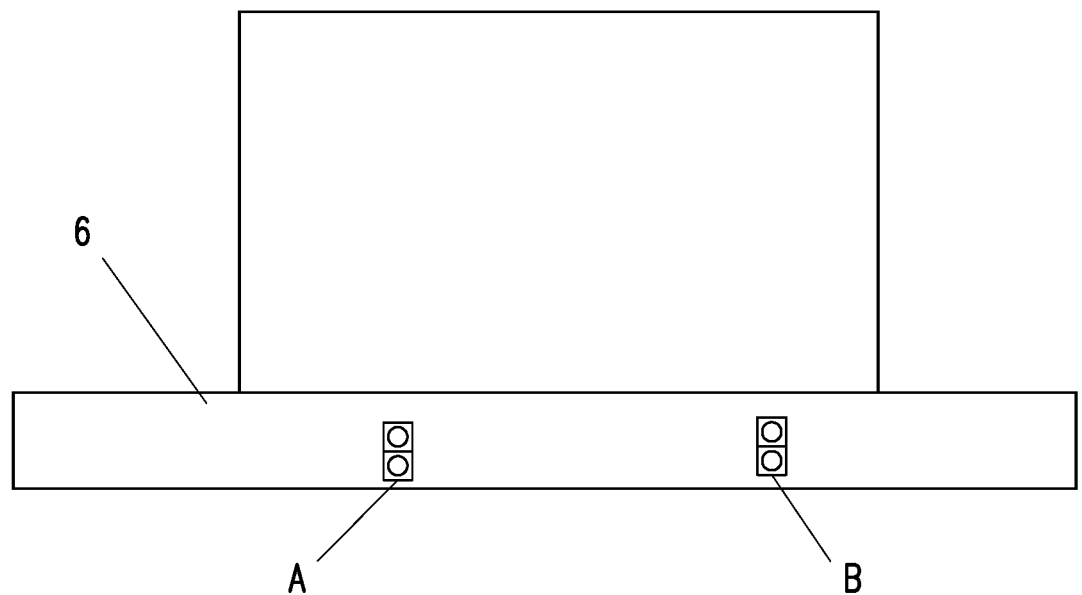
FIG. 1 is a front view of a contactless control device mounted on a range hood according to an embodiment of the present invention.
Figure 2:
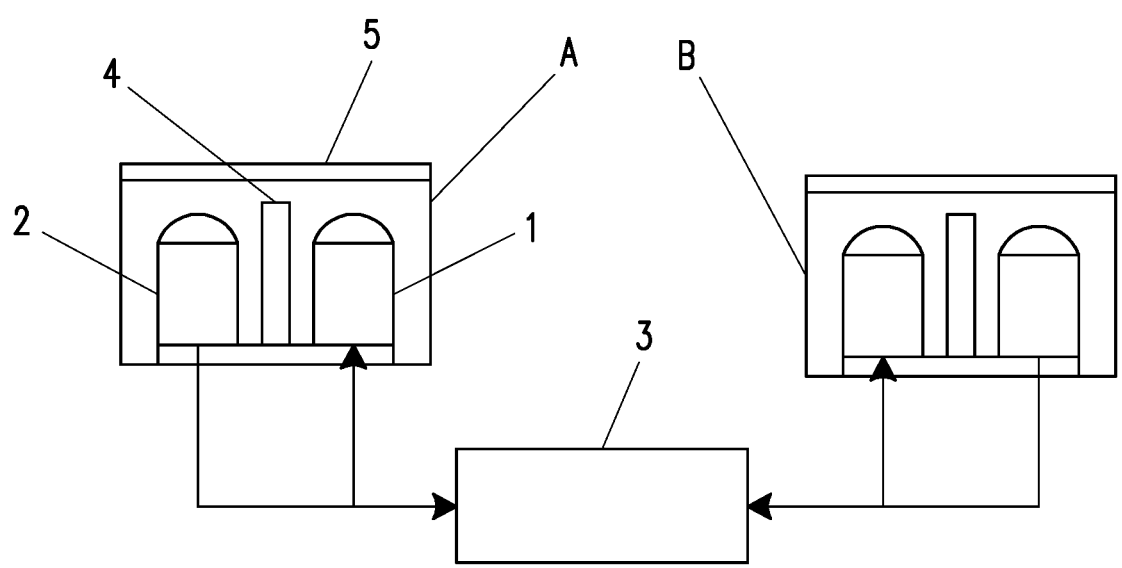
FIG. 2 is a view of the contactless control device according to the embodiment of the present invention.

To enable a further understanding of the present invention content of the invention herein, refer to the detailed description of the invention and the accompanying drawings below:

FIGS. 1-2 show an embodiment of the contactless control device for a range hood. The range hood comprises a housing 6. The contactless control device comprises two sets of infrared gesture sensing devices disposed on a front side of the housing 6 of the range hood (for an European style range hood, the two sets of infrared gesture sensing devices may be disposed on a control panel on a front side of the hood) and a detected signal analysis device 3 connected to the two sets of infrared gesture sensing devices. The two sets of infrared gesture sensing devices are defined as a set-a infrared gesture sensing device A and a set-b infrared gesture sensing device B. The set-a infrared gesture sensing device A and the set-b infrared gesture sensing device B have the same structure. Each set of the infrared gesture sensing devices comprises one infrared receiving device 1 and at least one infrared transmitting device 2. In this embodiment, each set of the infrared gesture sensing devices comprises one infrared receiving device 1 and one infrared transmitting device 2. An infrared light isolator 4 is disposed between the infrared receiving device and the infrared transmitting devices. The housing 6 has two mounting holes at the front side of the housing 6 for mounting the two sets of infrared gesture sensing devices. The housing 6 of the range hood around the mounting holes is made from an opaque material. A light filter 5 configured to filter ambient light is disposed at the outside surface of each mounting hole. In addition, each set of the infrared transmitting devices may have multiple infrared transmitting devices 2, for example, three, four, five or six, all distributed in a circle, with the infrared receiving device 1 being the center of the circle, and the radius of the circle is less than 30 m. In this way, each set of the infrared gesture sensing devices can detect the signal better. The infrared receiving device 1 and all the infrared transmitting device 2 of each set of the infrared gesture sensing devices are connected to the detected signal analysis device 3. The distance L between two infrared receiving devices in the two sets of infrared gesture sensing devices meets the following condition:

$$H^*\tan(\theta)+H^*\tan(\beta)+W\_min<L<H^*\tan(\theta)+H^*\tan(\beta)+W\_max,$$

where, W_min represents the minimum value of the width of a person's hand and is a preset constant greater than 50 mm, W_max represents the maximum value of the width of the person's hand and is a preset constant less than 200 mm, θ represents the maximum infrared signal transmitting angle of the set-a infrared gesture sensing devices at a direction close to the set-b infrared gesture sensing devices, β represents the maximum infrared signal receiving angle of the set-b infrared gesture sensing devices at a direction close to the set-a infrared gesture sensing devices. When the two sets of infrared gesture sensing devices are properly mounted on the range hood, the values of θ and β can be measured since the mounting holes provided for mounting the infrared gesture sensing devices is fixed on the range hood. H is a preset maximum sensing distance.

A straight line is formed between the two infrared receiving devices, and a direction of the straight line is a gesture operation direction. Under this design, it is unnecessary to control the sensing distance according to the intensity of the infrared transmitted signals. In this way, it is convenient to adjust the intensity of the infrared transmitted signals, the infrared receiving device can better detect infrared signals, and, it ensures that gesture signals within the maximum sensing distance will not interfere with each other.

Figure 3:
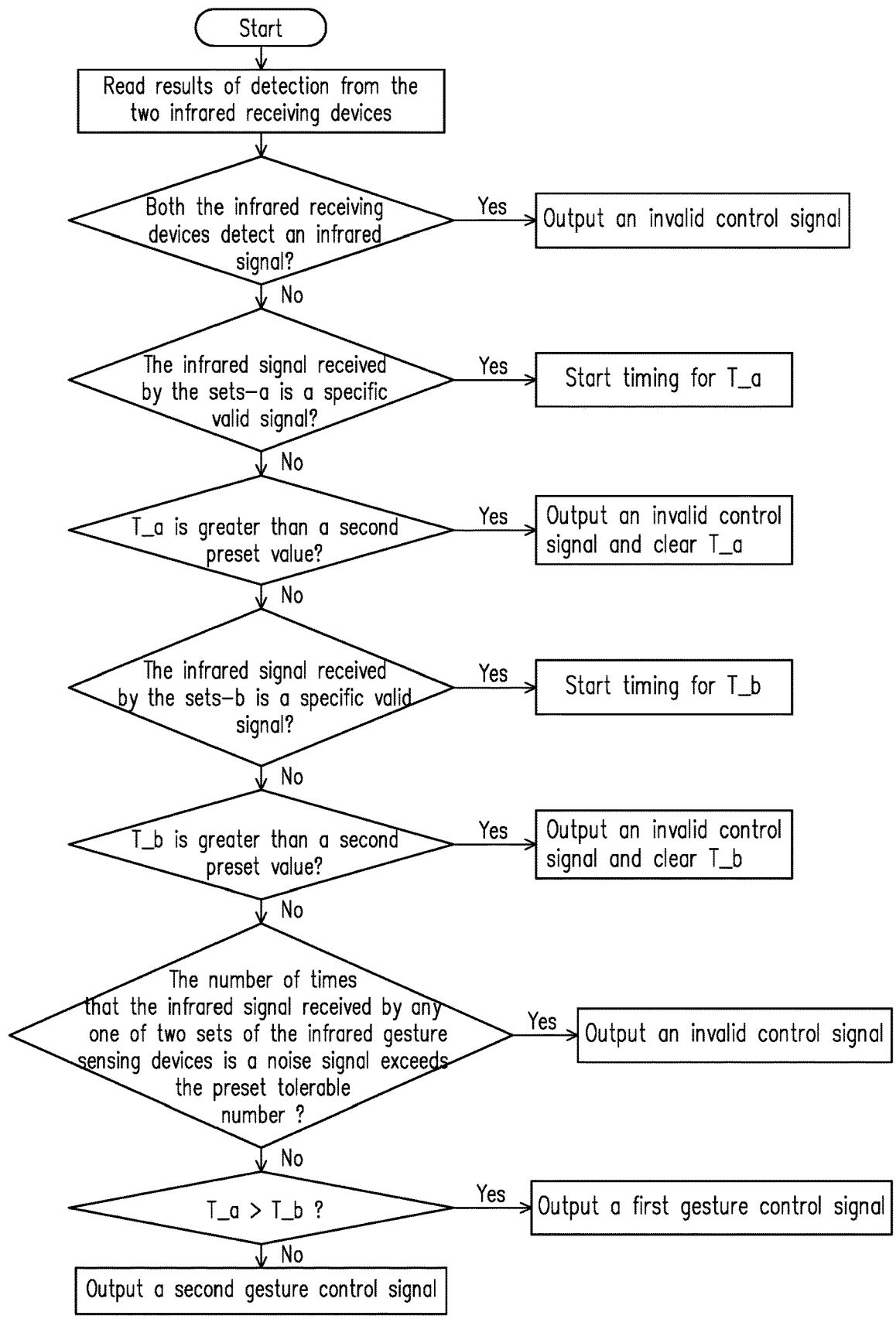
FIG. 3 is a control flowchart for the contactless control device for a range hood according to the embodiment of the present invention.

The present invention also provides a control method for the contactless control device. The detected signal analysis device enables the two sets of infrared gesture sensing devices to work in the same time and outputs a control signal through the following steps, as shown in FIG. 3.

S1: the detected signal analysis device reads results of detection from the two infrared receiving devices. If both the infrared receiving devices detect an infrared signal, the detected infrared signal is determined as a signal exceeding the maximum sensing distance or an interference signal from an object (for example, the head) whose size is greater than W_max. In this case, the detected signal analysis device outputs an invalid control signal.

S2: if only one of the infrared receiving devices detects an infrared signal, the detected signal analysis device records the time duration when this infrared receiving device receives the infrared signal. If the time duration is greater than a first preset value, the detected signal analysis device uses the infrared signal received by this infrared receiving device as a specific valid signal. If the time duration is less than the first preset value, the detected signal analysis device uses the infrared signal received by this infrared receiving device as a noise signal.

S3: on the basis of S2, if the detected signal analysis device determines that the infrared signal received by the infrared receiving device in the set-a infrared gesture sensing device is a specific valid signal, the detected signal analysis device starts timing, and the timing duration is represented by T_a. If T_a is greater than a second preset value, the detected signal analysis device outputs an invalid control signal and T_a is cleared. If T_a is not greater than the second preset value, the detected signal analysis device determines whether the infrared signal received by the infrared receiving device in the set-b infrared gesture sensing device is the specific valid signal. If the infrared signal received by the infrared receiving device in the set-b infrared gesture sensing device is the specific valid signal, the detected signal analysis device starts timing, and the timing duration is represented by T_b. If T_b is greater than the second preset value, the detected signal analysis device outputs an invalid control signal and T_b is cleared. If T_b is not greater than the second preset value, the detected signal analysis device continues determining whether the number of times that the infrared signal received by the infrared receiving device in each of the two sets of infrared gesture sensing devices is a noise signal exceeds a preset tolerable number. If the number of times that the infrared signal received by the infrared receiving device in any one set of the infrared gesture sensing devices is the noise signal exceeds the preset tolerable number, it is determined that the quality of signal is low. Generally, the signal with low quality may be a signal fed back by irregular and rugged objects, for example, the head. In this case, the detected signal analysis device outputs an invalid control signal. If the number of times that the infrared signal received by the infrared receiving device in both of the two sets of infrared gesture sensing devices is a noise signal does not exceed the preset tolerable number, the detected signal analysis device continues determining whether T_a is greater than T_b. If T_a is greater than T_b, the detected signal analysis device outputs a first gesture control signal. If T_a is less than T_b, the detected signal analysis device outputs a second gesture control signal. The rotation speed of the fan and the ON/OFF operation of the range hood can be controlled according to the two gesture control signals output by the detected signal analysis device.

What is claimed is:

1. A contactless control device for a range hood, the range hood comprising a housing, the contactless control device comprising two sets of infrared gesture sensing devices disposed on the housing, and a detected signal analysis device connected to the two sets of infrared gesture sensing devices, wherein the two sets of the infrared gesture sensing devices are defined as a set-a infrared gesture sensing device and a set-b infrared gesture sensing device, each set of the infrared gesture sensing devices comprises one infrared receiving device and at least one infrared transmitting device, and the infrared receiving device and all of the at least one infrared transmitting device are connected to the detected signal analysis device, wherein a distance L between two infrared receiving devices respectively in the two sets of the infrared gesture sensing devices meets the following condition:

$$H*\tan(\theta)+H*\tan(\beta)+W\_min<L<H*\tan(\theta)+H*\tan(\beta)+W\_max,$$

W_min represents a minimum value of a width of a person's hand and is a preset constant greater than 50 mm, W_max represents a maximum value of the width of the person's hand and is a preset constant less than 200 mm, θ represents a maximum infrared signal transmitting angle of the set-a infrared gesture sensing device at a direction close to the set-b infrared gesture sensing device, β represents a maximum infrared signal receiving angle of the set-b infrared gesture sensing device at a direction close to the set-a infrared gesture sensing device, and H is a preset maximum sensing distance.

2. The contactless control device of claim 1, wherein each set of the infrared gesture sensing devices has multiple infrared transmitting devices all distributed in a circle, with the infrared receiving device being the center of the circle, and a radius of the circle is less than 30 m.

3. The contactless control device of claim 2, wherein in said each set of the infrared gesture sensing devices, an infrared light isolator is disposed between the infrared receiving device and the infrared transmitting devices.

4. The contactless control device of claim 1, wherein in each set of the infrared gesture sensing devices, a light filter configured to filter ambient light is disposed outside the infrared receiving device and the infrared transmitting devices.

5. A control method for the contactless control device of claim 1, wherein the detected signal analysis device enables the two sets of infrared gesture sensing devices to work in the same time and outputs a control signal through the following steps:

S1: the detected signal analysis device reads a detection result from the two infrared receiving devices among the two sets of the infrared gesture sensing devices, and outputs an invalid control signal if both of the two infrared receiving devices detect an infrared signal;

S2: if only one of the infrared receiving devices detects the infrared signal, the detected signal analysis device records a time duration when the one of the infrared receiving device receives the infrared signal; if the time duration is greater than a first preset value, the detected signal analysis device uses the received infrared signal as a specific valid signal; and if the time duration is less than the first preset value, the detected signal analysis device uses the received infrared signal as a noise signal;

S3: on the basis of S2, if the detected signal analysis device determines that the infrared signal received by the infrared receiving device in the set-a infrared gesture sensing device is the specific valid signal, the detected signal analysis device starts timing, and a timing duration is represented by T_a; if T_a is greater than a second preset value, the detected signal analysis device outputs the invalid control signal and T_a is cleared; if T_a is not greater than the second preset value, the detected signal analysis device determines whether the infrared signal received by the infrared receiving device in the set-b infrared gesture sensing device is the specific valid signal, if the infrared signal received by the infrared receiving device in the set-b infrared gesture sensing device is the specific valid signal, the detected signal analysis device starts timing, and a timing duration is represented by T_b; if T_b is greater than the second preset value, the detected signal analysis device outputs the invalid control signal and T_b is cleared; if T_b is not greater than the second preset value, the detected signal analysis device continues determining whether the number of times that the infrared signal received by the infrared receiving device in the each of the two sets of the infrared gesture sensing devices is a noise signal exceeds a preset tolerable number; if the number of times that the infrared signal received by the infrared receiving device in any one set of the infrared gesture sensing devices is the noise signal exceeds the preset tolerable number, the detected signal analysis device outputs the invalid control signal; if the number of times that the infrared signal received by the infrared receiving device in both the two sets of infrared gesture sensing devices is the noise signal does not exceed the preset tolerable number, the detected signal analysis device continues determining whether T_a is greater than T_b; if T_a is greater than T_b, the detected signal analysis device outputs a first gesture control signal; and If T_a is less than T_b, the detected signal analysis device outputs a second gesture control signal.

* * * * *